US006729731B2

United States Patent
Gnanamgari et al.

(10) Patent No.: US 6,729,731 B2
(45) Date of Patent: May 4, 2004

(54) UNTETHERED LASER POINTER FOR USE WITH COMPUTER DISPLAY

(75) Inventors: Sakunthala Gnanamgari, Devon, PA (US); Arthur Lico, Lansdowne, PA (US)

(73) Assignee: Info Valley Corporation, King of Prussia, PA (US)

(*) Notice: Subject to any disclaimer, the term of this patent is extended or adjusted under 35 U.S.C. 154(b) by 138 days.

(21) Appl. No.: 10/039,512

(22) Filed: Jan. 4, 2002

(65) Prior Publication Data
US 2002/0186351 A1 Dec. 12, 2002

Related U.S. Application Data
(60) Provisional application No. 60/297,405, filed on Jun. 11, 2001.

(51) Int. Cl.$^7$ ............... G03B 21/00; G09G 5/00
(52) U.S. Cl. ............... 353/42; 345/158
(58) Field of Search ............... 353/42; 345/157, 345/158

(56) References Cited

U.S. PATENT DOCUMENTS

| | | | |
|---|---|---|---|
| 5,515,079 A | 5/1996 | Hauck | 345/157 |
| 5,517,210 A | 5/1996 | Ogino et al. | 345/157 |
| 5,682,181 A | 10/1997 | Nguyen et al. | 345/158 |
| 5,793,361 A | 8/1998 | Kahn et al. | 345/179 |
| 5,835,078 A | 11/1998 | Arita et al. | 345/158 |
| 5,859,623 A | 1/1999 | Meyn et al. | 345/1 |
| 5,914,783 A | 6/1999 | Barrus | 356/375 |
| 5,920,841 A | 7/1999 | Schottmuller et al. | 704/275 |
| 6,012,980 A | 1/2000 | Yoshida et al. | 463/2 |
| 6,050,690 A | 4/2000 | Shaffer et al. | 353/122 |
| 6,091,410 A | 7/2000 | Lection et al. | 345/330 |
| 6,094,197 A | 7/2000 | Buxton et al. | 345/358 |
| 6,129,552 A | 10/2000 | Deshoux et al. | 434/226 |
| 6,275,214 B1 | 8/2001 | Hansen | 345/158 |
| 6,346,933 B1 * | 2/2002 | Lin | 345/157 |

OTHER PUBLICATIONS

Sweed, U.S. application No. 09/453,258, "Display Pointer Tracking Device", referenced by Air Force, no copy.
Elrod et al., "Liveboard: A Large Interactive Display Supporting Group Meetings, Presentations And Remote Collaboration", CHI '92, May 3–7, 1992, pp. 599–607.
Jedrysik et al., "The Interactive Data Wall", AFRL Report, Spring 1999, 16 pages.
Olsen and Nielsen, "Laser Pointer Interaction", CHI 2001, Mar. 31–Apr. 5, 2001, pp. 17–22.
Olsen et al., "Join and Capture: A Model for Nomadic Interaction", UIST '01, Nov. 11–14, 2001, pp. 131–140.
Rohall and Lahtinen, "The VIEP System: Interacting with Collaborative Multimedia", UIST'96, 1996, pp. 59–66.

* cited by examiner

*Primary Examiner*—W. B. Perkey
(74) *Attorney, Agent, or Firm*—RatnerPrestia

(57) ABSTRACT

Interaction with a display occurs. A light point is transmitted towards the display. A mode of operation of the light point is established based on timing associated with illumination of the light point.

24 Claims, 9 Drawing Sheets

UNTETHERED LASER POINTER FOR USE WITH COMPUTER DISPLAY

This application claims the benefit of a Provisional application No. 06/297,405 filed Jun. 11, 2001.

FIELD OF THE INVENTION

This invention is in the field of projection systems and specifically is directed to interacting with a projection display. In particular, a method and apparatus for interacting with a projection display using a pointing device such as a laser pen is disclosed.

BACKGROUND OF THE INVENTION

Computers are often utilized in conjunction with projection screens or displays for presentations and meetings. For example, it is common to display a slide show that is stored within the memory of a computer onto a projection display. Typically, the person giving a presentation (a presenter) interfaces with the computer via input devices (e.g., keyboard, mouse) in order to effectuate a change on the projection screen. For example, the presenter may be seated at the keyboard and scroll from slide to slide in a slide show by striking the enter key.

Laser pointers are also widely used for meetings and presentations. For example, the presenter may use a laser pointer to draw attention to a particular area of the projection screen. As such, a slide may be projected on a projection display and the presenter may direct the laser pointer towards the display, thus causing a red dot to appear on the desired area of a display.

These conventional techniques for interacting with a projection display suffer from numerous drawbacks. When the presenter is forced to utilize computer input devices to interact with the projection display, the presenter typically remains within a close proximity of the computer system. This is because the presenter uses the computer input devices (e.g., keyboard, mouse) to interact with the projection display. This may be undesirable, as the presenter may prefer to walk around the room and not remain fixed at the computer station. Further, when utilizing a laser pointer to draw attention to the projected display, the area highlighted is only momentary. As such, the image projected on the projection display is not altered by directing a laser pointer at the image. Accordingly, a presenter cannot readily draw attention to more than one area of the projection display at a time, because once the laser pointer is moved to a new area of the display, the red dot disappears from the first area.

Therefore, it would be desirable to have a system that allows a presenter to interface with a projection display more readily, and more effectively.

SUMMARY OF THE INVENTION

Interaction with a display occurs. A light point is transmitted towards the display. A mode of operation of the light point is established based on timing associated with illumination of the light point.

In a preferred embodiment, a combined image of the light point and an image on the display is captured and processed to determine a position of the light point. The image on the display is then updated based on at least one of the position of the light point and the mode of operation of the light point.

An apparatus for interacting with a display using a light point is also disclosed. The apparatus includes timing means that determine timing associated with illumination of the light point. Control means control a mode of operation of the light point based on the timing.

In a preferred embodiment, the apparatus includes a projector to project the image onto the display. A camera is also included for capturing a combined image of the light point and an image on the display. An image processor processes the combined image to determine the position of the light point with respect to the image. Update means update the image on the display based on the position of the light point, the operational mode of the light point, or both.

DETAILED DESCRIPTION OF THE INVENTION

Figure 1A:
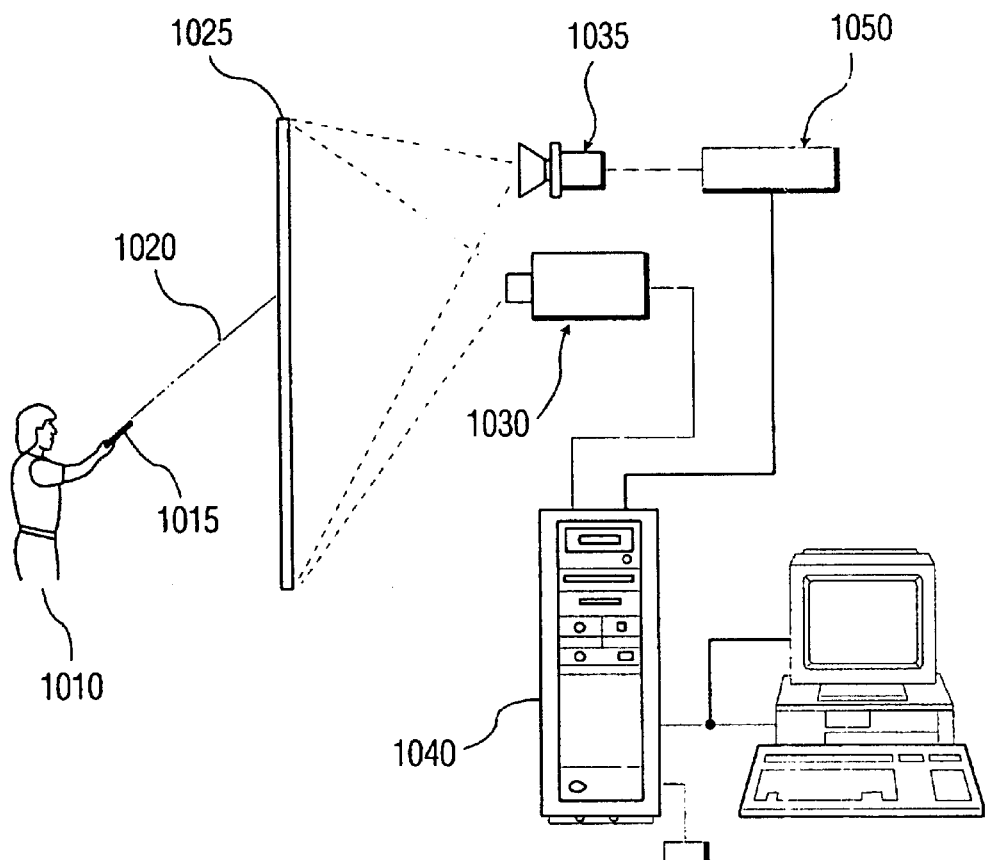
FIGS. 1A and 1B are block diagrams which are useful for explaining operation of an exemplary embodiment of the present invention.

The present invention relates to a method and apparatus for using a pointing device such as a laser pen in conjunction with a display. In a preferred embodiment, the display is a projected display and the image being displayed is provided by a computer device.

Projected displays are commonly used to communicate in presentations in conference rooms. It is desirable to be able to make a note on a projected display during a presentation or a meeting. Also, it is desirable to be able to interact with the computer which is generating the display during the presentation or meeting.

In a preferred embodiment of the present invention, a user stands in front of a projected display and holds a laser pen (light pen, pointer, etc.) in his hand. The user activates the laser pen and points the laser pen towards the projected display. In one mode, as the light being emitted from the laser pen strikes the projected display, images are drawn on the projected display. Thus, as the emitted light moves along the screen on which the projected display is being projected, the computer generated image may be modified so that lines appear along the locations which are indicated by the laser light. In another mode, the laser pen behaves as a cursor and allows images to be selected, buttons or links to be "clicked", or windows to be moved. It is particularly desirable that there be no connection between the laser pointer and the computer. Thus, the user is free to walk about the room and point the laser pointer towards the display and thus is interact with the computer that is generating the image on the display.

It is also desirable to provide a laser pointer or laser pen capable of having numerous operational modes. For example, one operational mode of the laser pointer may be to emulate the operation of a left mouse click and another operational mode of the laser pointer may be to emulate the operation of a right mouse click. Additional exemplary operational modes of the laser pointer may be a drag feature, and a draw feature (for drawing lines on the display of varying colors and thicknesses).

The control function for switching between operational modes may be accomplished in any of a number of ways. For example, upon a certain condition being met, a software loop may switch the operational mode of the light point. Alternatively, a hard wired switching device may be used to switch from one operational mode to another. It is understood that the control function of the operational mode of the light point may be accomplished in software, hardware, or a combination of software and hardware.

In an exemplary embodiment of the present invention, the active operational mode of a laser pointer may be changed by measuring the time between illuminations of the laser pointer. For example, if a time measured (by a computer, for example) between illuminations of the laser pointer is within a certain range, then the laser pointer may be switched to a corresponding operational mode, such as the left mouse click mode.

The time measured between illuminations of the laser pointer can be measured in any of a number of ways. For example, as shown in the figures, software on a computer can measure the time interval between illuminations. Alternatively, a hard wired timing circuit may also be used to measure the time intervals. It is understood that the timing measured between illuminations of the light point may be measured in software, hardware, or a combination of software and hardware.

In another exemplary embodiment of the present invention, the active operational mode of a laser pointer may be changed by successive double clicks of the pointer switch or button (e.g., the switch that illuminates the laser pointer). For example, a first double click of the pointer may result in the pointer having a first operational mode, such as LeftMouseClick. A second double click may result in the mode changing to RightMouseClick. Thus, for example, each double click of the pointer is recognized as a toggle between operational modes of the pointer. It is understood that the pointer may "toggle" between additional or different operational modes using this embodiment.

In another exemplary embodiment of the present invention, the active operational mode of a laser pointer may be changed by measuring the time interval between illuminations in addition to determining a position of laser light from the light pointer. For example, if the position of laser light from the light pointer is determined to be in a predetermined area corresponding to a left mouse click (for example, the left hand side of the display), and the time interval measured also corresponds to a left mouse click, then the active operational mode of the laser pointer may be changed to the LeftClickMode. If the position of laser light from the light pointer is determined to be in a different predetermined area corresponding to a right mouse click (for example, the right hand side of the display), and the time interval measured also corresponds to a right mouse click, then the active operational mode of the laser pointer may be changed to the RightClickMode. The position of the light point corresponding to a particular operational mode does not necessarily have to be on the display. For example, in a particular embodiment the position of the light point may be determined by a camera and image processing equipment. The area scanned by the camera may exceed the size of the display. As such, an area beyond the display may correspond to a light point position that corresponds to a specific operational mode In another exemplary embodiment of the present invention, the active operational mode of a laser pointer may be changed by using voice recognition. For example, the user may orally communicate a voice command, and voice recognition will recognize the voice command and switch the laser pointer to the operational mode that corresponds to the voice command. For example, the user may say "Left mouse click". If voice recognition recognizes the command "Left mouse click" as a command to switch the laser pointer to the left mouse click mode, then the laser pointer will be switched to that mode. In another example, the user may say "Draw green". If voice recognition recognizes the command "Draw green" to correspond to the operational mode for drawing a green line on the display, then a green line will be drawn on the display as long as the laser pointer is active in this operational mode.

The function of voice recognition may be accomplished in any of a number of ways. For example, software on a computer may be used to receive and recognize a voice command. Optionally, a voice recognition circuit may be used. It is understood that a voice command may be received and recognized in software, hardware, or a combination of software and hardware.

It is understood that voice recognition software is readily commercially available and can be used to implement the exemplary embodiment of the present invention by one of ordinary skill in the art. For example, Microsoft Corporation is an example of such voice recognition software.

Figure 1B:
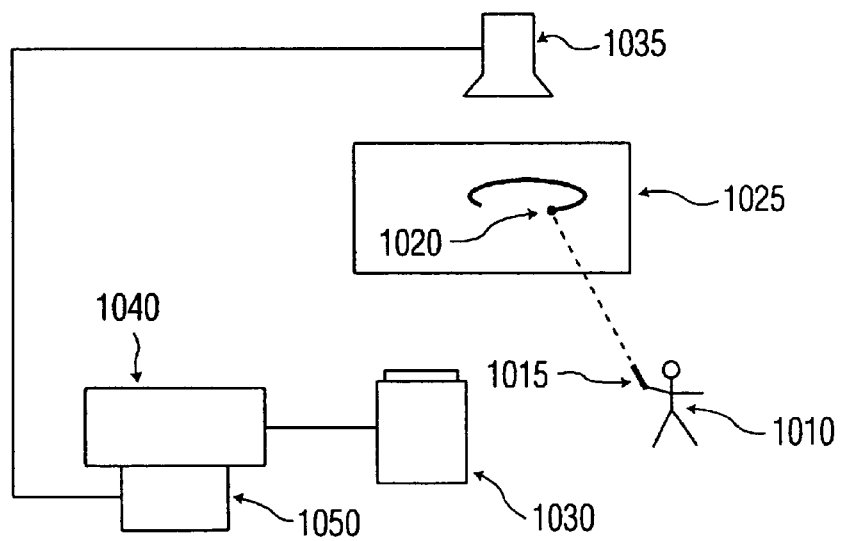

FIGS. 1A and 1B provide block diagram illustrations of exemplary embodiments of the present invention. In FIG. 1A, user 1010 holds laser pen 1015 in his hand. Laser pen 1015 emits laser pointer light (LPL) 1020. LPL 1020 strikes projection screen 1025.

Projector 1030 is projecting an image on projection screen 1025. While projector 1030 may be on either side of projection screen 1025, in the preferred embodiment projector 1030 is on the side of projection screen 1025 opposite to that of user 1010. In this exemplary embodiment, projector 1030 is projecting an image which is generated by computer 1040. Camera 1035 receives the image which is displayed on projection screen 1025 by a combination of projector 1030 and LPL 1020. While camera 1035 may be on either side of projection screen 1025, in the preferred embodiment, camera 1035 is on the side of projection screen 1025 opposite to that of user 1010. Frame grabber 1050 digitizes the image which is received by camera 1035. Computer 1040 performs image processing and analysis of sequential images retained by frame grabber 1050. Based on the detected location of LPL 1020, and/or the operational mode of laser pen 1015, computer 1040 modifies the image which is transmitted to projector 1030.

Although, the scanning of the combined image (the image on the display and the light point) and updating of the image on the display have been described above in terms of a camera, frame grabber and computer image processing, the scanning and updating may be accomplished in any of a number of ways. For example, it is preferred to utilize software on a computer to digitize and update the image on the display. Alternatively, the functions of scanning the combined image and updating the displayed image may be accomplished using hard wired devices, such as a scanner and comparator circuitry. It is understood that the scanning and updating of the image may be accomplished in software, hardware, or a combination of software and hardware.

Operation of an exemplary embodiment of the present invention may also be described with reference to FIG. 1B. When computer 1040 (which includes a display processor) and projector 1030 are both in the operating mode, computer 1040 sends a video signal to projector 1030, which continuously projects the image onto the projection screen 1025. Camera 1035 sitting behind screen 1025 scans the image at, for example, 30 frames per second. The camera sends this information to frame grabber 1050. The image acquired by frame grabber 1050 is subject to further processing in computer 1040. User 1010 standing in front of projection screen 1025 starts to point at the screen using laser pen 1015. Camera 1035 scans the image combined with LPL 1020 and sends the combined image to frame grabber 1050. The output of frame grabber 1050 is analyzed by image processing software residing in computer 1040. Based on laser beam intensity, the position of LPL 1020 is obtained. Its coordinates relative to the screen 1025 are then converted into mouse coordinates and used to simulate mouse movements. Based on the appearance of LPL 1020, its coordinates, the time measured between two sequential appearances, and the state of mouse operations such as left click, right click or holding a button down can be simulated as well. User 1010 can use laser pen 1015 instead of a mouse. Also, a user can make a line appear on the display using laser pointer 1015.

Figure 1C:
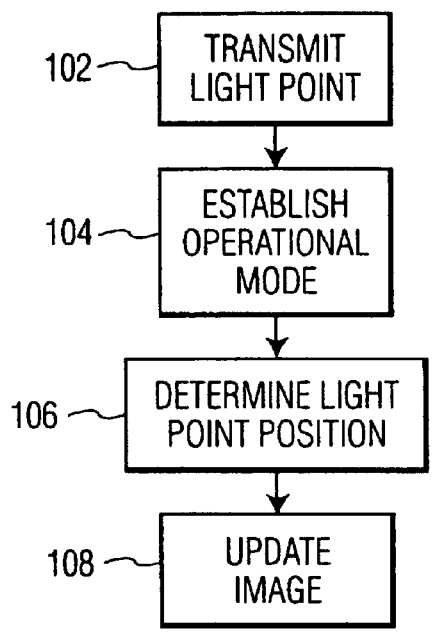
FIG. 1C is a flowchart diagram which illustrates operation of an exemplary embodiment of the present invention.

FIG. 1C is a flowchart diagram which illustrates operation of an exemplary embodiment of the present invention. At step 102, laser point light is transmitted towards the display. A computer generated image is projected onto the display as well. Therefore, the laser point light and the image both appear on the display. At step 104, the operational mode of the light point is established. The mode of operation of the light point is established based on time intervals associated with the illumination of the light point and/or a position of the light point. For example, a specific time interval measured between illuminations of the light point may correspond to a specific mode of operation of the light point, for example, the left mouse click function of a computer. In another example, the specific time interval measured and the position of the light point both may correspond to another specific mode of operation of the light point, for example, the right mouse click function of a computer.

At step 106, the position of the light point with respect to the image on the display is determined. After the position of the light is determined, the image on the display is updated at step 108 The image on the display may be updated based on the position of the light point, the operational mode of the light point, or both the position and operational mode of the light point.

Figure 1D:
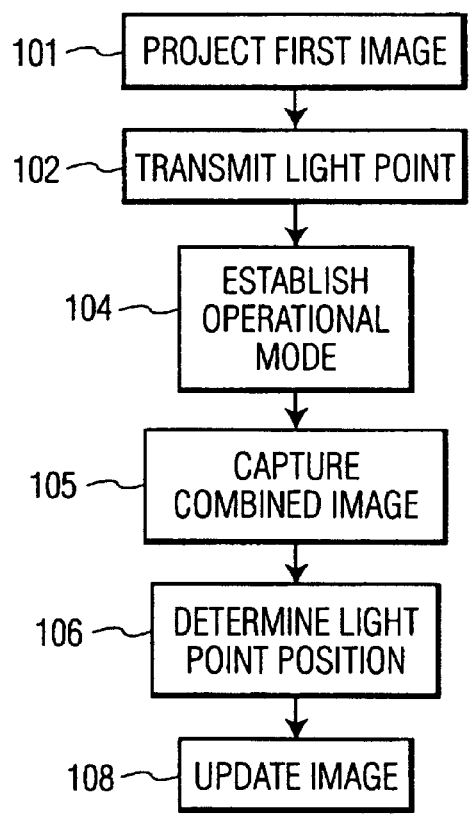
FIG. 1D is a flowchart diagram which illustrates operation of a further exemplary embodiment of the present invention.

FIG. 1D is another flowchart diagram illustrating operation of another exemplary embodiment of the present invention. At step 101, a first image is projected on the display. For example, the first image may be stored in the memory of a computer and transmitted from the computer to a projector. From the projector, the first image is projected onto the display. At step 102, laser point light is transmitted towards the display. Therefore, both the first image and the light point appear on the display. At step 104, the operational mode of the light point is established, as described above.

At step 105, the combined image of the first image and the light point is captured. For example, a camera may capture the combined image by scanning the image at, for example, 30 frames per second. The camera may then send this information to a frame grabber. A computer may then receive the is scanned combined image from the frame grabber.

At step 106, the position of the light point with respect to the first image is determined. After the position of the light point is determined, the first image projected on the display is updated at step 108.

Figure 1E:
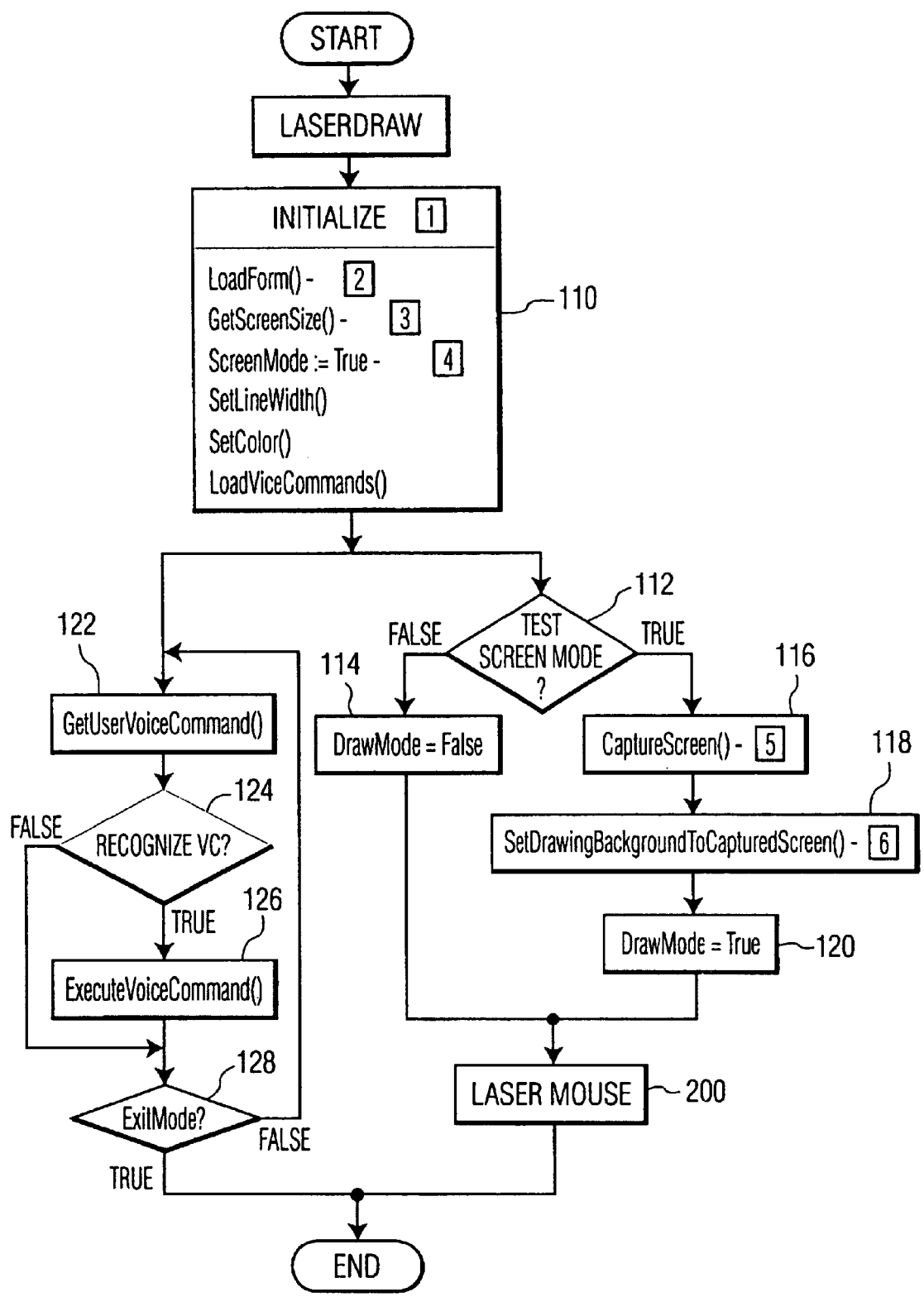
FIG. 1E is a flowchart diagram which illustrates initial steps in accordance with operation of an exemplary embodiment of the present invention.

FIG. 1E is a flowchart diagram which illustrates initial steps in accordance with operation of an exemplary embodiment of the present invention.

At step 110, initialization is the first procedure that is invoked when the LaserDraw program starts. This may include a number of steps. For example, a LoadForm operation is performed in order to download the appropriate code into the computer memory. A GetScreenSize function may then be performed in order to determine the current screen resolution. In other words, the width and height of the screen measured in pixels is determined. This is useful to correlate the position of objects on the screen and the position of the light which is transmitted onto the screen from the laser. Next, a ScreenMode variable may be set. If this variable is set to a True state, use of the laser on the screen will cause the screen display (or contents) to change. Such a change may include, for example, causing lines to appear on the screen in locations which correspond to locations which are illuminated by the laser pen. If ScreenMode is set to a False value, then use of the laser pen on the screen does not have an effect on the screen visual display. In an alternative embodiment of the present invention, if ScreenMode is set to False, while use of the laser pen does not change the contents of the screen, it may be used in order to access desktop-like functions. For example, if the ScreenMode is set to False, it is still possible to access pull-down menus. It is also possible to move windows from one location to another.

Next, in initialization step 110, it is possible to set line widths and colors to be used for drawing on the screen. Further, if voice recognition is used to control the operational mode of the laser pointer a LoadVoice command function may also be loaded at step 110.

Next, at step 112, it is determined whether the ScreenMode has been entered. If ScreenMode has been set to False, then processing proceeds to step 114. At step 114, the variable DrawMode is set to False. The variable DrawMode indicates whether or not drawing is permitted on the screen.

This variable will be accessed later. Returning to step 112, if ScreenMode has been set to the True state, then processing proceeds to step 116. At step 116, a snapshot of the computer generated desktop may be captured and converted, for example, into a bit map image. This snapshot will be stored and will be used later.

Processing then proceeds to step 118. Any image including the previously captured desktop (or something else such as maps, blank backgrounds, etc.) is then displayed. The image is being used as a background on which further drawing will occur. At step 120, the variable DrawMode is set to True. This enables drawing to occur on the screen at step 200.

If voice recognition is used to control the operational mode of the laser pointer, then the left branch of the program execution (Steps 122, 124, 126 & 128) illustrated in FIG. 1E will run in parallel to LaserMouse 200. Once a voice command is issued, program execution will commence at GetUserVoiceCommand function 122. Function 122 accesses the value of the voice command. The voice command is then checked at step 124 to determine if it is recognized as a valid voice command associated with the LaserDraw program.

If the voice command is not recognized, the program will check the value of the ExitMode function at step 128. If the ExitMode value is set to true, then the program will be exited. If the ExitMode value is not set to true, then the program will wait for the next voice command to be issued.

If the voice command is recognized the command is executed at the ExecuteVoiceCommand function 126. For example, if the voice command is "Left mouse click", and this is recognized as a valid voice command at step 124, then the operational mode of the laser pointer will be changed to LeftClick mode at step 126.

Laser Mouse module 200 will now be explained by reference to FIG. 2.

Figure 10:
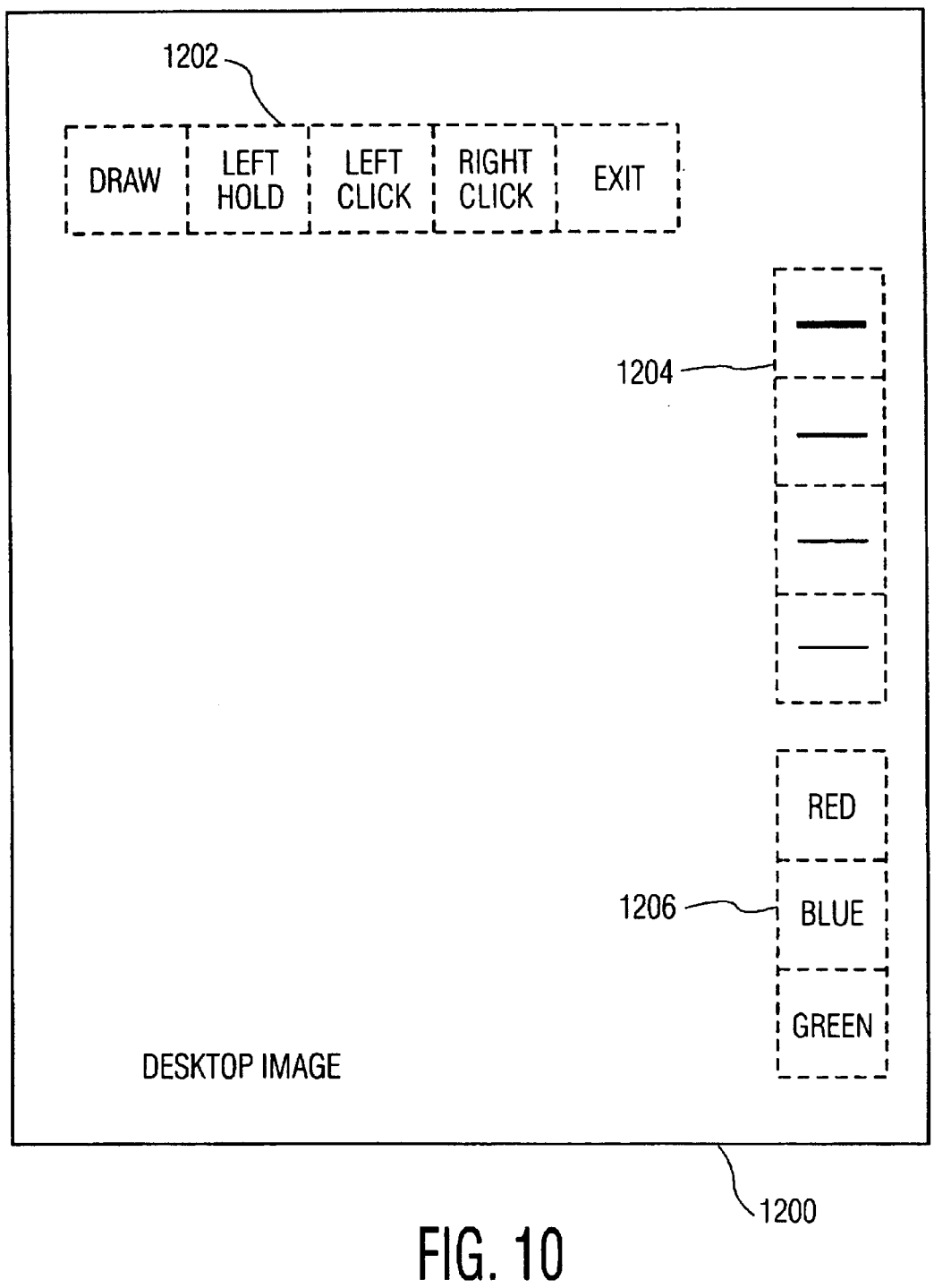
FIG. 10 illustrates a user interface in accordance with an exemplary embodiment of the present invention.

At step 202, initialization occurs. This may include, for example, a number of different steps. For example, an OpenFrameGrabber step may be performed in order to initialize the frame grabber. Operation of the frame grabber will be described later. A LoadForm operation may then be performed. In this operation, the user interface (i.e., mouse control interface) is displayed. An exemplary user interface is illustrated in FIG. 10 and will be described in further detail below.

A SetClickMode operation may also be performed. In this operation, the SetClickMode indicates how operation of the laser is to be interpreted. Thus the laser to some extent, may emulate operation of a mouse. As is known to one skilled in the art, a mouse can operate in a number of different ways. By performing a left click on a mouse, certain operations are performed. By performing a right click on a mouse, other operations are performed. Pressing down on the mouse may perform yet a further set of operations. Operation of the laser pen is desirably defined so that it corresponds to one of these modes. The user can indicate which one of these modes the laser pen is to emulate. Operation of the laser pen can be changed from one mode to another mode. Also, a SetExitMode may be established. This may be a variable which, when set to a predetermined condition, indicates that operation of the program is to be terminated.

At step 204, the pointer image is scanned. Scanning of the pointer image is illustrated through the flowchart diagram which is shown in FIG. 6.

Figure 6:
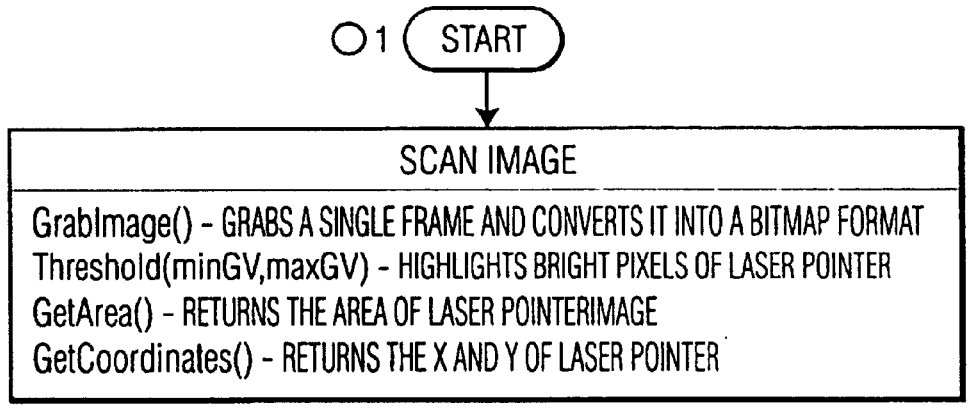
FIG. 6 illustrates scanning and grabbing of an image to generate coordinates in accordance with an exemplary embodiment of the present invention.

Referring to FIG. 6, the image is scanned. This may include a number of steps as follows. First, a GrabImage function may be implemented. In this function, a single frame is grabbed and converted into a bit map format. Grabbing a frame and converting the frame into a bit map format is accomplished in a manner which is readily understood to one of ordinary skill in the art. Thus, further explanation of that process will not be provided here. The frame may be grabbed using a camera which, again, is readily understood to one of ordinary skill in the art. In an exemplary embodiment of the present invention, a resolution of 640×480 pixels (which may be different than the resolution of the projected image) may be used. However, the resolution may be varied as desired by the user.

A Threshold function may then be performed. The Threshold function is performed in accordance with known image processing techniques. Thus, the bit map format image may be reduced to a gray scale having, for example, 256 different shades. The Threshold function is given a minimum gray scale value and a maximum gray scale value. These values may be programmer defined variables which depend upon programmer requirements. Thus, in a preferred embodiment of the present invention, the light which results from the laser hitting the screen will fall between the minimum gray scale value and the maximum gray scale value which is given to the Threshold function, while the remainder of the image will be below the minimum gray scale value given to the Threshold function. Again, the Threshold function operates as a filter and will convert the laser image (which again falls between the minimum and maximum gray scale values) to a completely white (for example) area while the remainder of the image may be black (for example) The GetArea function may return, for example, the number of pixels that occupy the area which was previously image processed to be white. A GetCoordinates function returns X and Y coordinates which correspond to the image processed white area. As the white area extends over a number of coordinates, the exact X and Y coordinates within that area to be returned may be determined based upon user preference. The center of gravity of the image processed white area, for example, may be used.

Having completed the steps shown in FIG. 6, it is useful now to refer again to FIG. 2 and to describe the GetExitMode (step 206). At this step, the Exit Mode variable is evaluated to determine whether program functions should be terminated. At step 208, the variable is tested and if True, then at step 209 program function is terminated. Otherwise, if the Exit Mode variable is False, then processing proceeds to step 210. At step 210, the image area is evaluated to determine whether or not it is equal to 0. The image area was previously determined from the GetArea function in FIG. 6. If, at step 210, the image area is equal to 0, then processing proceeds to step 212. At step 212, the amount of time between two "clicks" (i.e., illuminations) of the laser pen is measured. Thus, at step 212, the operation of "Letting Go" of the laser pen (where the laser transitions from an on state to an off state) begins to measure the time until subsequent illumination of the laser. Processing may then continue to step 204 and the steps outlined above may be performed.

When the laser is off, the image processed area of the laser is zero. When the laser is on, the image processed area of the laser is greater than zero. Steps 204–212 are performed until the image area at step 210 is greater than 0. Once the image area at step 210 is greater than 0, processing proceeds to step 214 at which time measurement which has been initiated at step 212 is terminated. In other words, at step 214, the total amount of time between subsequent "clicks" (i.e., turning the laser pen on and off analogously to a mouse click) of the laser pen is determined. At step 216, the value of the GetClickMode variable is determined. At step 218, the value of the DrawMode variable is determined Then, at step 220, a cursor is moved on the screen (which corresponds to mouse movement) in accordance with the information which has been obtained at steps 214, 216 and 218.

Figure 7:
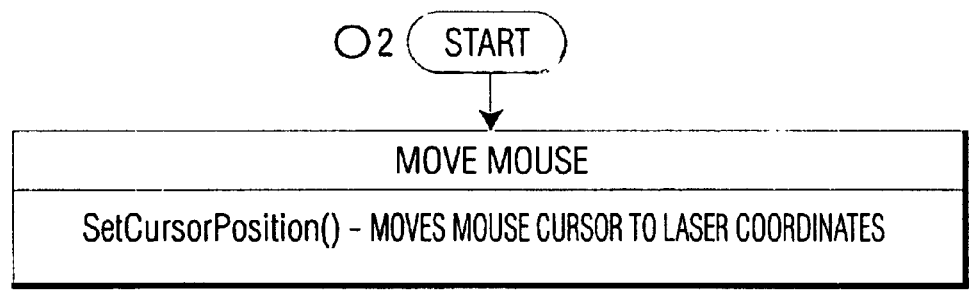
FIG. 7 illustrates movement of a cursor on a screen responsive to movement of a pointer in accordance with an exemplary embodiment of the present invention.

Further operation of MoveMouse step 220 will now be explained with reference to FIG. 7. The MoveMouse function illustrated in FIG. 7 includes a SetCursorPosition function which will now be described. The SetCursorPosition function relies upon the X and Y coordinates of the laser pen which were obtained from the GetCoordinates function shown in FIG. 6. Thus, the SetCursorPosition now has X and Y coordinates which correspond to the position of the laser pen on the screen. The cursor being displayed on the screen as part of the image display is then moved to the position which corresponds to the X and Y coordinates which were given to that function. In other words, the cursor is moved (i.e., to the location corresponding to the center of gravity the light hitting the screen from the pointer)

Figure 2:
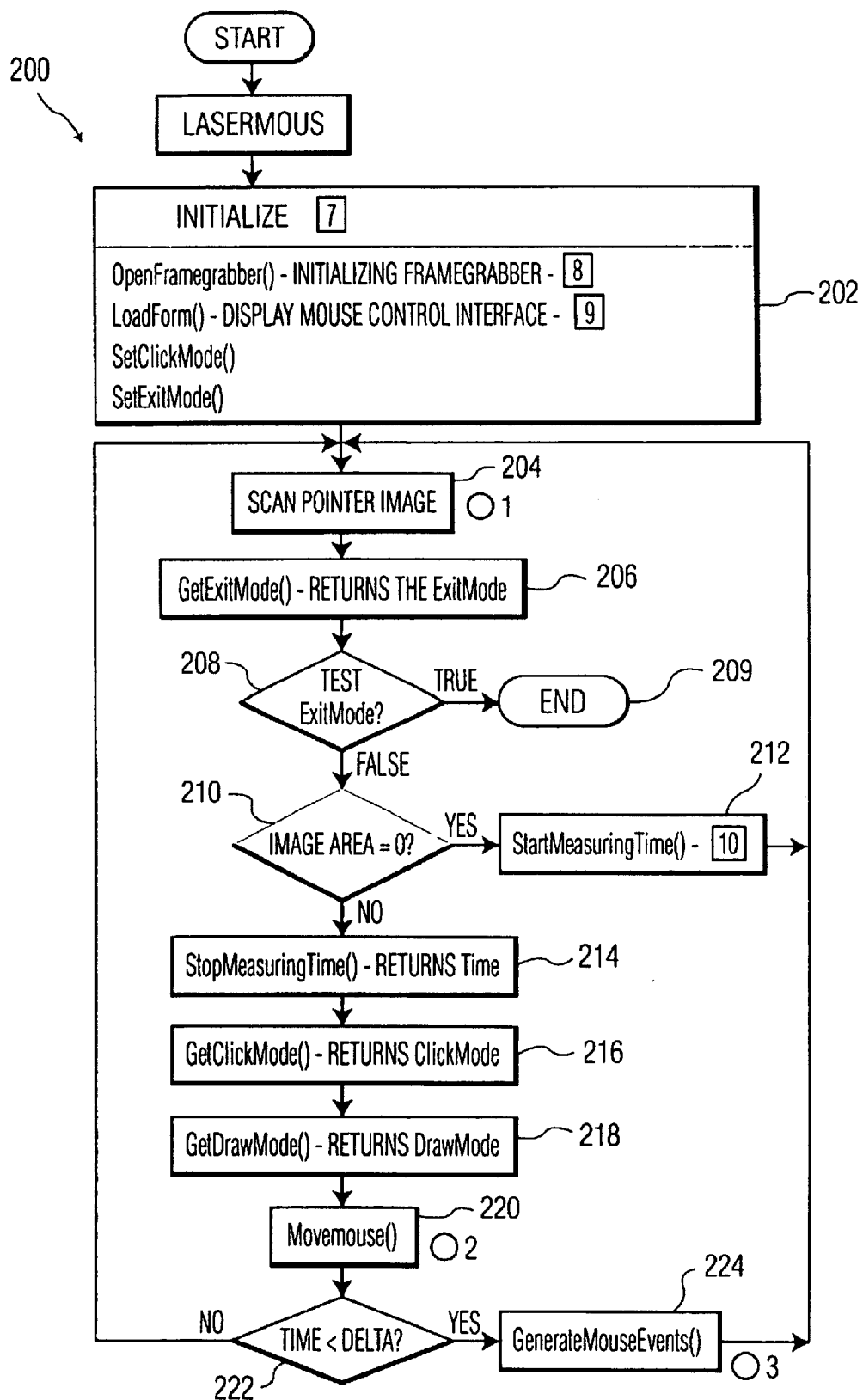
FIG. 2 is a further flowchart diagram which illustrates system initialization in accordance with an exemplary embodiment of the present invention.

Processing then proceeds to step 222 in FIG. 2. At step 222, the time which was measured in step 214 is evaluated to determine whether or not it is below a predetermined value Delta. If the time is below a predetermined value Delta, then processing proceeds to step 224. Step 224 is a GenerateMouseEvents function which will now be described with reference to the flowchart diagram which is included in FIG. 3.

Figure 3:
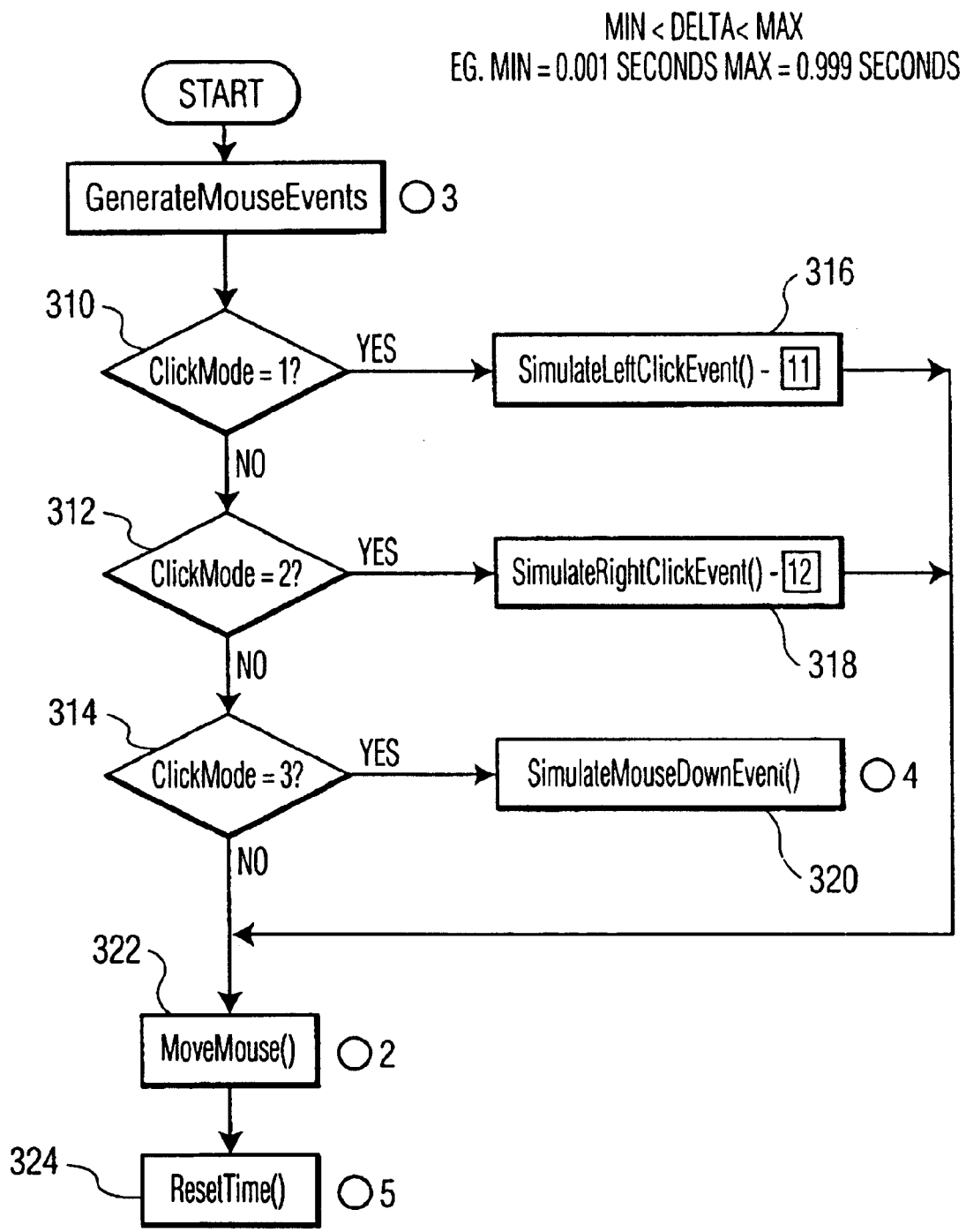
FIG. 3 is a flowchart diagram which is useful for explaining mouse operation in accordance with an exemplary embodiment of the present invention.

The process of generating mouse events is shown in FIG. 3. A "mouse event" is causing the laser pen to emulate operation of a mouse. As illustrated in the Figure, steps 310, 312 and 314 are included. Steps 310, 312 and 314 include the steps of determining the value of ClickMode. In the illustration provided, ClickMode may be a 1, 2 or 3. The values 1, 2 or 3 may represent, for example, LeftClick Mode (clicking a mouse's left button), RightClick Mode (clicking a mouse's right button), Left Hold Down Mode (holding down a mouse's left button), respectively. If it is determined that LeftClick Mode, RightClick Mode or Left Hold Mode have been selected, processing proceeds to steps 316, 318 or 320, respectively. Steps 316, 318 and 320 may be, for example, operations which are performed by the operating system based upon the mouse clicks (or holds), respectively.

Additional operational modes other than LeftClick Mode, RightClick Mode, and LeftHoidDown Mode may be included in the GenerateMouse function. Therefore, ClickMode may have a value other than 1, 2 or 3.

Since ClickMode values are limited to 1, 2 or 3 in this example, if ClickMode does not correspond to values 1, 2 or 3, then operation proceeds to step 322 where the MoveMouse function is performed.

The MoveMouse function is described with reference to the flowchart diagram which appears in FIG. 7 and has been previously described.

Figure 8:
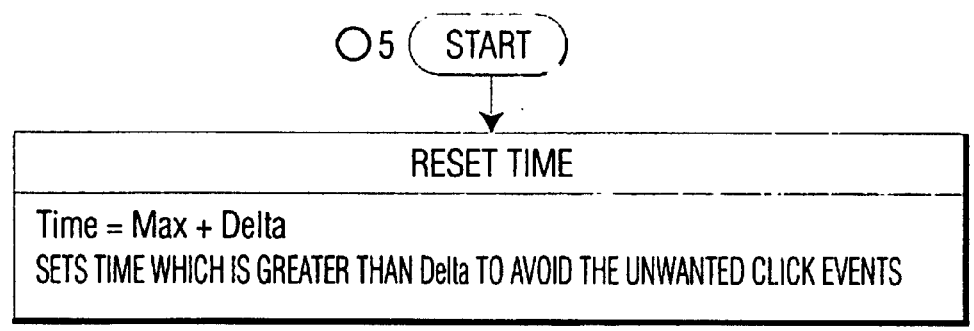
FIG. 8 is a flowchart diagram which illustrates the measurement of time between subsequent clicks of a pointer in order to indicate that some predetermined action is to be taken in accordance with an exemplary embodiment of the present invention.

Once the MoveMouse function has been completed, operation proceeds to step 324. At step 324, the ResetTime function is performed. The ResetTime function is illustrated by the flowchart diagram which appears in FIG. 8. In FIG. 8, the predetermined value Delta and a predetermined maximum value are added together to generate a time value. Processing will then continue in FIG. 3 which will be explained below.

Returning to step 314, if ClickMode equals 3, then SimulateMouseDownEvent 320 will be performed. This is illustrated by the flowchart diagram which appears in FIG. 4.

Figure 4:
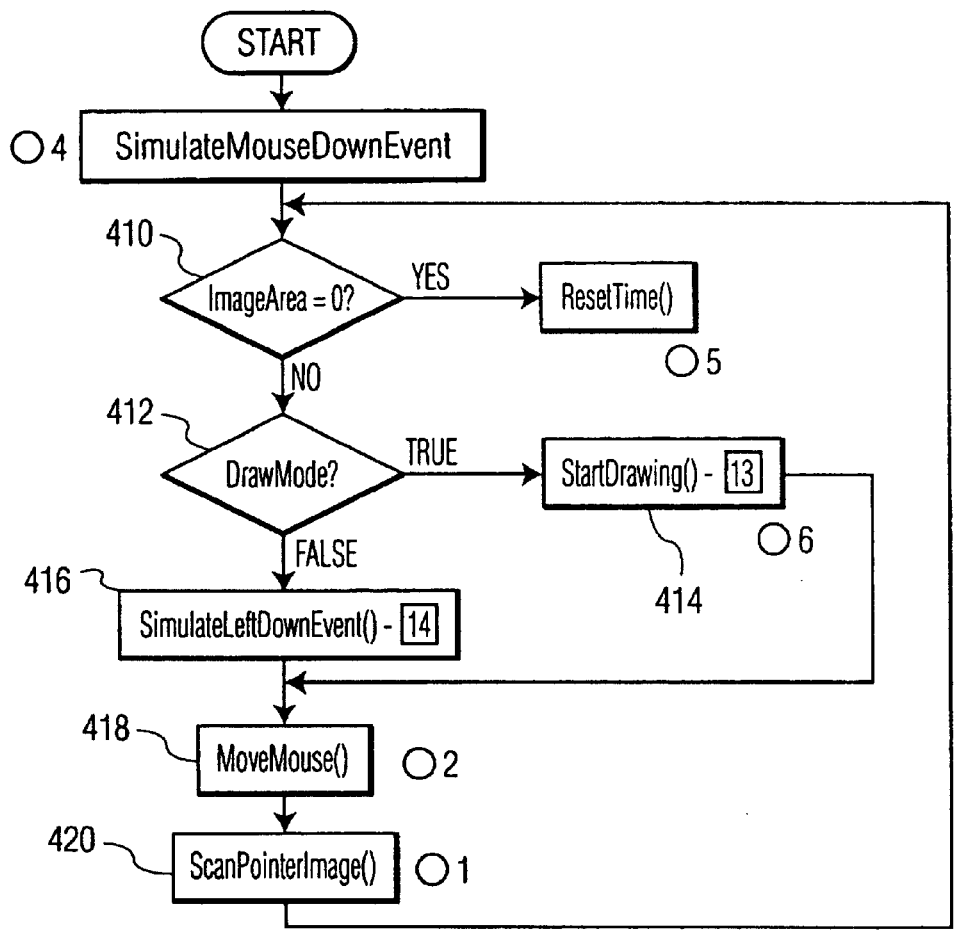
FIG. 4 is a flowchart diagram which is useful for illustrating a drawing of images on a screen using an I/O device such as a mouse in accordance with an exemplary embodiment of the present invention.
Figure 5:
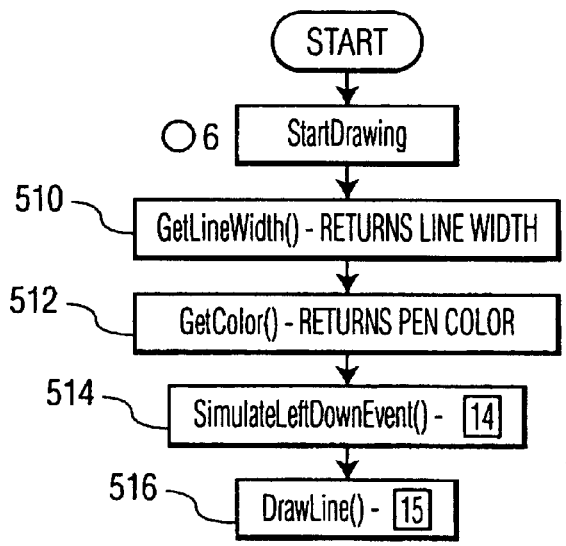
FIG. 5 is a flowchart diagram which illustrates the actual formation of images on a screen (responsive, for example, to mouse operation) in accordance with an exemplary embodiment of the present invention.

As previously described, FIG. 4 provides the steps with which images are drawn on the screen. At step 410, a determination is made as to whether the image area equals 0. If the image area equals 0, then the ResetTime function is implemented as illustrated in FIG. 8 so that the time value is set to a maximum value plus Delta. Processing then returns to FIG. 2 at step 224. If the image area is not equal to 0, then a determination is made as to whether the program is in the drawing mode. If, at step 412, the program is in the drawing mode, then processing proceeds to step 414. At step 414, the StartDrawing function is initiated. StartDrawing is illustrated by the flowchart diagram which is included in FIG. 5 and will be explained below. If the program is not in the drawing mode, then processing continues to step 416. At step 416, the SimulateLeftDownEvent is performed. The SimulateLeftDownEvent function is similar to other operating system-type functions which were implemented, for example, in steps 316 and 318. Then, at step 418, the MoveMouse function is performed. The MoveMouse function was described in FIG. 7. Finally, at step 420, the ScanPointerImage function is performed. The ScanPointerImage function was described with reference to the flowchart diagram which is included in FIG. 6. Operation then continues to step 410 and the program continues therefrom.

Referring to step 414, the StartDrawing function will now be described in detail. The StartDrawing function is illustrated with the flowchart diagram which is included in FIG. 5. Thus, at steps 510 and 512, line width and color will be set based upon where the user "clicked" with his laser pen on the screen. Thus, again, a determination needs to be made as to the location where the user clicked. This information is used to determine the desired line width and color which the user wishes to use At step 514, a SimulateLeftDownEvent may be performed as was previously described with respect to FIG. 4, step 416. Finally, at step 516, the DrawLine function is initiated and point-to-point line drawing may then be accomplished. Thus, a variety of coordinates at which the laser pen has been pointing to are identified and lines may then be drawn to appear between those points.

Figure 9:
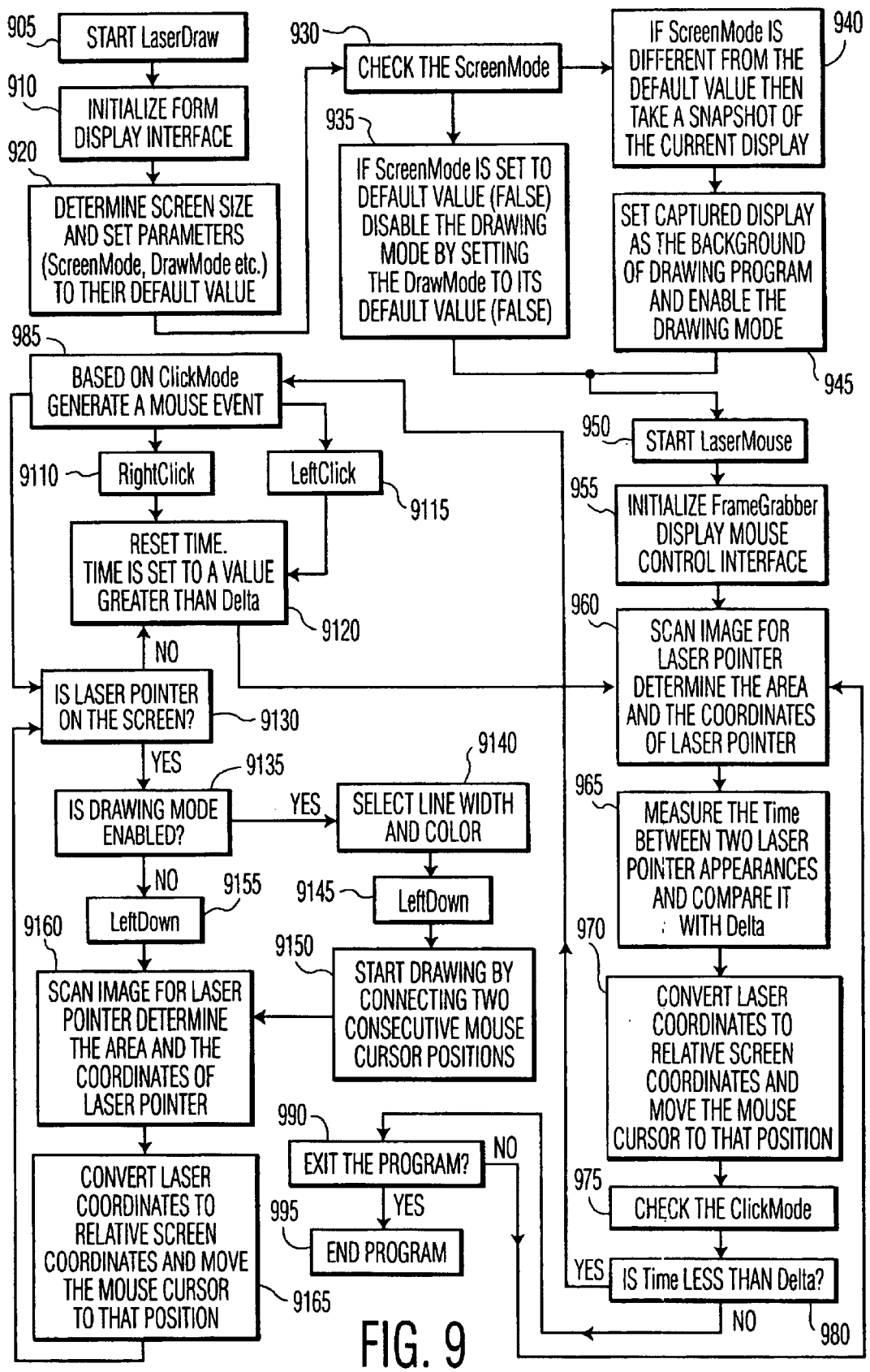
FIG. 9 is a flowchart diagram which is helpful for explaining operation of an exemplary embodiment of the present invention.

Operation of an exemplary embodiment of the present invention may now be summarized with the help of the flowchart diagram which is illustrated in FIG. 9. At step 905, the laser drawing process begins. At step 910, the display interface is initialized. At step 920, screen size is determined and parameters such as the drawing mode are set to their default value. At step 930, the screen mode variable is checked. At step 935, if the screen mode variable is set to the default value, the drawing mode is disabled by setting the drawing mode to its default value. Otherwise, at step 940, if the screen mode variable is different than the default value then a snapshot of the current display is obtained. At step 945, any image including the captured display is set as the background for the screen image and the drawing mode is enabled. The captured display is, for example, the desktop At step 950, the laser mouse operation begins This includes the steps of initializing the frame grabber, displaying the mouse control interface (step 955), scanning the image for the laser pen and determining the area and respective coordinates to which the laser pen is pointing (step 960), measuring the time between two successive laser pen appearances and comparing that time with a predetermined value Delta (step 965), converting the laser coordinates to relative screen coordinates and moving the mouse cursor to the calculated screen coordinates (step 970), checking what mode the program is in (step 975), and determining at step 980 whether the elapsed time between two laser pointer appearances is less than the predetermined value Delta. If the time is less than Delta, then operation proceeds to step 985 where a mouse event (see steps 9110 and 9115) is generated. Otherwise, at step 990 it is determined whether the program should be exited. If indeed the program should be exited, then at step 995 the program is indeed exited. Otherwise, processing continues to step 960. At step 9110 and 9115, it is determined whether laser pointing which corresponds to a right click or a left click may have occurred, and the actions associated with a right click or a left click are carried out. Then at step 9120, the timer is reset.

Although the time measured by the timer may correspond to a right click or a left click as described above, the time measured by the timer may correspond to additional functions of a mouse, or additional drawing related functions of the light point.

At step 9130, it is determined whether the laser pen is causing laser light to appear on the screen. If the laser pointer is not causing laser light to appear on the screen, then processing proceeds to step 9120. Otherwise, at step 9135, it is determined whether the drawing mode is enabled. If the drawing mode is enabled, then at step 9140, line width and color are selected. At step 9145, a left down mode is enabled and at step 9150, drawing by connecting two consecutive mouse cursor positions is initiated. If at step 9135 the drawing mode has not been enabled, then left down mode is entered at step 9155 and the image is scanned for the laser pointer to determine the area and coordinates of the laser pointer (step 9160). At step 9165, the laser coordinates are converted to relative screen coordinates and the mouse cursor is moved to that position. Then, processing proceeds to step 9130.

As discussed above, the time interval measured between illuminations of the light point may result in a particular operational mode (LeftClick, RightClick, LeftHold) being executed. In another embodiment, a particular operational mode may be executed based on both a position of the light point and the time interval measured between illuminations of the light point. The time interval between illuminations of the light point (and/or the position of the light point), however, may correspond to operational modes other than functions of a computer mouse. For example, it may be desirable to select one of a plurality of colors used to draw lines on the display with the light point by measuring the time interval between illuminations of the light point. More specifically, when in Draw mode, a certain time interval between illuminations of the light point (and/or a position of the light point) may correspond to a red line being drawn. Other operational modes, such as line thickness of the line to be drawn, could also be selected based on the time interval between illuminations of the light point (and/or a position of the light point).

In an alternative embodiment of the present invention, when the operational mode of the laser pointer is changed, the image on the display will be updated to indicate the active operational mode. For example, the image may include an area that indicates the active operational mode of the laser pointer. Upon initialization of the system, the laser pointer may have a default mode, such as LeftMouseClick, and the aforementioned area of the image may include an indication of the default mode. When the operational mode of the pointer is changed, for example to the RightMouseClick mode, the aforementioned area would be updated to indicate the updated mode.

In another embodiment of the present invention, it may be desirable to include selectable buttons on the image displayed. For example, rather than select an operational mode of the light point based on the time interval between illuminations and/or the position of the light point, selectable buttons may be included on the display.

For example, FIG. 10 illustrates an exemplary screen image with an exemplary user interface. The user interface shown is desktop image 1200. Desktop image 1200 may occupy some of the screen or may extend to all sides of the screen. As shown in FIG. 10, a plurality of user interface buttons may appear on a portion of the desktop image 1200. For example, numerous light point functions are included in interface button group 1202. For example, interface button group 1202 includes a DrawMode, LeftHoldMode, LeftClickMode, RightClickMode, and ExitMode. Therefore, one of interface buttons may be selected to change the operational mode of the light point. Similarly, interface button group 1204 is also provided. Interface buttons 1204 provide varying line widths from which to choose when drawing a line on the display. Therefore, if the user desires to select a drawing line of a particular width, the user may select one of the interface buttons in the interface button group 1204. Further, the user may desire to select a line color from which to draw on the display. Interface button group 1206 is provided on desktop image 1200 in order to provide a group of optional colors. It is to be understood that the interface buttons in groups 1202, 1204 and 1206 are optional. All of these functions may be completed in alternative ways such as by using voice commands.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of interacting with a display, said method comprising:
    transmitting a light point towards said display; and
    establishing a mode of operation of said light point based on timing associated with illumination of said light point.

2. The method of claim 1 further comprising the steps of:
    determining a position of said light point with respect to an image on said display; and
    updating said image based on at least one of said position and said mode of operation.

3. The method of claim 1 wherein said mode of operation is established based on said timing and a position of said light point.

4. The method of claim 1 wherein said timing corresponds to an interval between successive illuminations of the light point.

5. The method of claim 1 wherein said timing corresponds to a sequence of operations of the light point.

6. The method of claim 2 further comprising the step of:
    establishing a color range corresponding to a scanned color of said light point,
    wherein said step of determining includes scanning said light point and said image on said display, and
    said position of said light point corresponds to a scanned area having a color within said color range.

7. The method of claim 2 wherein said image is updated based on both said position and said mode of operation.

8. The method of claim 1 further comprising the steps of:
    receiving a voice command; and
    effecting operation of said light point based on said voice command.

9. A method of interacting with a display, said method comprising the steps of:

projecting a first image on said display;

transmitting a light point towards said display;

establishing a mode of operation of said light point based on timing associated with illumination of said light point;

capturing a combined image of said first image together with said light point;

processing said combined image to determine a position of said light point; and updating said first image based on at least one of said position and said mode of operation.

10. The method of claim 9 wherein said mode of operation is established based on said timing and said position.

11. The method of claim 9 wherein said first image is updated based on both said position and said mode of operation.

12. The method of claim 9 further comprising the steps of:

receiving a voice command; and effecting operation of said light point based on said voice command.

13. An apparatus for interacting with a display via a light point, said apparatus comprising:

timing means for determining timing associated with illumination of said light point; and control means for controlling a mode of operation of said light point based on said timing.

14. The apparatus of claim 13 additionally comprising:

scanning means for determining a position of said light point with respect to an image on said display; and update means for updating said image based on at least one of said position and said mode of operation.

15. The apparatus of claim 13 wherein said mode of operation is controlled based on said timing and a position of said light point.

16. The apparatus of claim 13 wherein said timing means determines time intervals between successive illuminations of said light point.

17. The apparatus of claim 13 wherein said timing corresponds to a sequence of operations of said light point.

18. The apparatus of claim 14 wherein said scanning means scans a combined image including said light point and said image on said display and determines said position of said light point by determining an area of said combined image that has a color corresponding to a color range of a scanned light point.

19. The apparatus of claim 14 wherein said update means updates said image based on both said position and said mode of operation.

20. The apparatus of claim 13 further comprising voice recognition means for receiving a voice command and effecting operation of said light point based on said voice command.

21. An apparatus for interacting with a display via a light point, said apparatus comprising:

a projector for projecting a first image on said display;

a light point for transmission toward said display;

timing means for determining timing associated with illumination of said light point;

control means for controlling a mode of operation of said light point based on said timing;

a camera for capturing a combined image of said first image together with said light point;

an image processor for processing said combined image to determine a position of said light point; and update means for updating said first image based on at least one of said position and said mode of operation.

22. The apparatus of claim 21 wherein said mode of operation is controlled based on said timing and said position.

23. The apparatus of claim 21 wherein said update means updates said first image based on both said position and said mode of operation.

24. The apparatus of claim 21 further comprising voice recognition means for receiving a voice command and effecting operation of said light point based on said voice command.

* * * * *